March 11, 1924.
J. E. SHAFFER
GAUGE COCK
Filed March 31, 1923
1,486,162
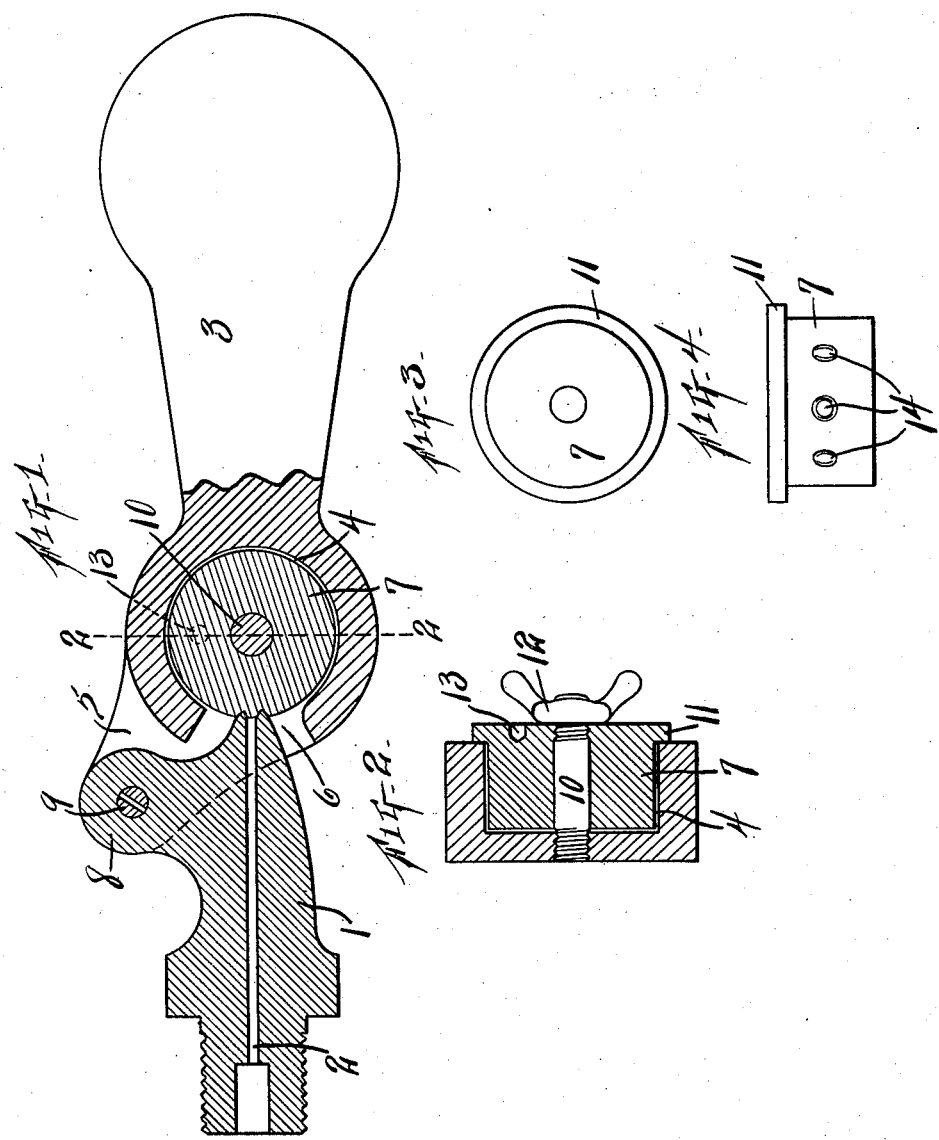
Inventor
J. E. SHAFFER.
By A. L. Jackson
Attorney Patented Mar. 11, 1924.

1,486,162

UNITED STATES PATENT OFFICE.

JOHN E. SHAFFER, OF TULSA, OKLAHOMA.

GAUGE COCK.

Application filed March 31, 1923. Serial No. 629,017.

*To all whom it may concern:*

Be it known that I, JOHN E. SHAFFER, a citizen of the United States, residing at Tulsa, in the county of Tulsa and State of Oklahoma, have invented certain new and useful Improvements in Gauge Cocks, of which the following is a specification.

My invention relates to gauge cocks and more particularly to certain improvements on the Patent, No. 1,432,510, Oct. 17, 1922, which was issued to me as assignee; and the object is to simplify the construction of the cock so that it can be made at less cost of time and labor, to provide a cock which will prevent the hot steam or water from scalding the hands, and to provide means for suspending the valve in the valve cavity without touching the walls of the cavity, and to make the adjustment of the valve more easily and quickly accomplished. Other objects and advantages will be fully explained in the following description and the invention will be more particularly pointed out in the claims.

Reference is had to the accompanying drawings which form a part of this application.

Fig. 1 is a side elevation of the gauge cock, partly in section. Fig. 2 is a vertical cross-section, taken on the line 2—2 of Fig. 1. Fig. 3 is a view of the inner end of the valve, showing the opening for the spindle. Fig. 4 is a side elevation of the valve, illustrating the indentures made by the steam discharge nozzle.

Similar characters of reference are used to indicate the same parts throughout the several views.

The drawings show a steam discharge nozzle 1 provided with a steam passage 2. A handle 3 has a valve chamber or cavity 4 therein which is cylindrical in form and the handle has a slot 5 in the end and this slot extends to and communicates with the cavity 4. The slot 6 in the valve casing is elongated to permit a swinging movement of the discharge nozzle 1 so that this nozzle will engage the valve 7. The discharge nozzle has a boss 8 which projects up within the handle in slot 5 and is pivotally connected to the handle by a bolt 9. A stud bolt 10 is screwed into the bottom of the valve casing and made rigid therewith and serves as a spindle for the valve 7. The valve 7 is provided with a radial flange 11 and this flange bears against the outside of the valve casing or handle 3. The valve is held in place by a nut 12 which clamps the flange 11 against the outside of the casing or handle 3. In this manner the valve 7 is held suspended in its cavity without touching the walls thereof so that there can be no corrosion of the valve 7. The valve 7 is provided with a small cavity 13 in its outer face so that any suitable instrument can be inserted to move the valve. The steam nozzle 1 differs from the nozzle of the above noted patent in that the discharge duct 2 runs directly to the valve and is not curved. This will prevent the hot steam from escaping on the hands of the operators. The valve 7 is made of soft metal, usually of Babbitt metal so that the nozzle will make a sufficient indenture 14 to receive the end of the nozzle for making a seal. When the valve becomes worn about an opening 14, the valve can be turned slightly to bring a new surface in line to be struck by the point of the nozzle 1.

Various changes in the sizes, proportions, construction, and arrangement of the several parts of the gauge cock may be made without departing from my invention.

What I claim, is:—

1. A gauge cock comprising a handle provided with a cylindrical valve cavity therein and having a slot in the end thereof and an elongated slot opening into said cavity, a spindle rigid with said handle and centrally positioned in said cavity, a cylindrical valve of soft metal mounted loosely on said spindle and provided with a radial flange bearing against the outside of said handle, a nut screwed on the end of said spindle for clamping said flange against said handle for suspending said valve in said cavity, a steam discharge nozzle projecting in said elongated slot and adapted to make indentures in the periphery of said valve, and pivot bolt for pivotally connecting said handle to said steam nozzle.

2. A gauge cock comprising a weighted handle provided with a cylindrical valve cavity therein and an elongated slot opening into said cavity, a spindle rigid with said handle and centrally positioned in said cavity, a valve loosely mounted on said spindle and provided with a radial flange adapted to bear against said handle about said cavity, a nut screwed on said spindle for clamping said flange against said handle whereby said valve is held suspended in said cavity without touching the walls thereof, and a steam discharge nozzle projecting in said elongated slot and adapted to bear against the periphery of said valve and to make indentations therein, and means for pivotally connecting said handle to said nozzle.

In testimony whereof, I set my hand, this 26th day of March, 1923.

JOHN E. SHAFFER.